United States Patent
Schmidt

(10) Patent No.: US 11,677,271 B2
(45) Date of Patent: *Jun. 13, 2023

(54) LOAD AND CONSUMER

(71) Applicant: SEW-EURODRIVE GMBH & CO. KG, Bruchsal (DE)

(72) Inventor: Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 613 days.

This patent is subject to a terminal disclaimer.

(21) Appl. No.: 14/964,148

(22) Filed: Dec. 9, 2015

(65) Prior Publication Data

US 2016/0087459 A1    Mar. 24, 2016

Related U.S. Application Data

(63) Continuation of application No. 11/920,218, filed as application No. PCT/EP2006/003136 on Apr. 6, 2006, now Pat. No. 9,240,689.

(30) Foreign Application Priority Data

May 10, 2005   (DE) .................... 10 2005 022 367.2

(51) Int. Cl.
*H02J 50/10*    (2016.01)
*H02K 5/22*     (2006.01)
*H02K 11/00*    (2016.01)
*H02K 11/33*    (2016.01)
*H01F 27/28*    (2006.01)

(52) U.S. Cl.
CPC .......... *H02J 50/10* (2016.02); *H01F 27/2823* (2013.01); *H02K 5/225* (2013.01); *H02K 11/0094* (2013.01); *H02K 11/33* (2016.01)

(58) Field of Classification Search
CPC .......... H02J 5/005; H02J 50/10; H02K 5/225; H02K 11/0094; H02K 11/33; H01F 27/2823; Y10T 307/297
See application file for complete search history.

(56) References Cited

U.S. PATENT DOCUMENTS

| | | | |
|---|---|---|---|
| 4,142,178 A | 2/1979 | Whyte et al. | |
| 4,736,452 A * | 4/1988 | Daniels ................... | H02J 5/005 455/41.1 |
| 5,052,941 A | 10/1991 | Hernandez-Marti et al. | |
| 5,070,293 A | 12/1991 | Ishii et al. | |

(Continued)

FOREIGN PATENT DOCUMENTS

| | | |
|---|---|---|
| DE | 44 12 957 A1 | 10/1995 |
| DE | 19649682 A1 | 6/1998 |

(Continued)

OTHER PUBLICATIONS

European Office Action, dated Aug. 25, 2010, issued in corresponding European Patent Application No. 06724081.2.

(Continued)

*Primary Examiner* — Daniel Kessie

(74) *Attorney, Agent, or Firm* — Carter, DeLuca & Farrell LLP

(57) ABSTRACT

A load includes a device for inductively powering it, the device including an insertion part, following the insertion of which into the load the powering of the latter is provided.

21 Claims, 2 Drawing Sheets

(56) References Cited

U.S. PATENT DOCUMENTS

| | | | | |
|---|---|---|---|---|
| 5,293,308 | A | * | 3/1994 | Boys ................ H02J 5/005 363/37 |
| 5,301,096 | A | | 4/1994 | Klontz et al. |
| 5,325,046 | A | | 6/1994 | Young et al. |
| 5,550,452 | A | * | 8/1996 | Shirai ............... H01F 38/14 320/108 |
| 5,804,892 | A | | 9/1998 | Schwan et al. |
| 5,839,554 | A | | 11/1998 | Clark |
| 6,005,304 | A | * | 12/1999 | Seelig ............... H02J 5/005 307/104 |
| 6,089,512 | A | * | 7/2000 | Ansorge ............ B60L 5/005 246/194 |
| 6,127,800 | A | | 10/2000 | Kuki et al. |
| 6,310,291 | B1 | * | 10/2001 | Clough ............. H01R 13/6395 174/66 |
| 6,840,335 | B1 | * | 1/2005 | Wu ..................... B25F 5/02 173/217 |
| 7,084,527 | B2 | * | 8/2006 | Futschek ........... B60L 5/005 307/104 |
| 7,251,128 | B2 | * | 7/2007 | Williams ........... F16M 11/046 248/420 |
| 2003/0039880 | A1 | * | 2/2003 | Turner ............... H01M 2/1022 429/97 |
| 2004/0011544 | A1 | * | 1/2004 | Cooper .............. B25F 5/001 173/217 |
| 2007/0145936 | A1 | * | 6/2007 | Simon ............... H02J 5/005 318/693 |
| 2007/0297290 | A1 | * | 12/2007 | Vosburgh .......... H04B 13/02 367/131 |
| 2008/0207026 | A1 | * | 8/2008 | Meyer ............... H01M 2/1066 439/160 |
| 2011/0164360 | A1 | * | 7/2011 | Miyagi .............. G06F 1/1635 361/679.01 |
| 2012/0090907 | A1 | * | 4/2012 | Storc ................. B60K 1/04 180/68.5 |
| 2012/0161429 | A1 | * | 6/2012 | Rawlinson ......... B60N 2/012 280/801.1 |

FOREIGN PATENT DOCUMENTS

| | | |
|---|---|---|
| DE | 101 12 892 A1 | 10/2002 |
| DE | 10239252 A1 | 1/2004 |
| DE | 10360604 A1 | 7/2005 |
| EP | 0385502 A2 | 9/1990 |
| RU | 2 142 886 C1 | 12/1999 |
| WO | 99/50806 A1 | 10/1999 |
| WO | 01/73783 A1 | 10/2001 |
| WO | WO-2005020405 A1 | 3/2005 |

OTHER PUBLICATIONS

International Preliminary Report on Patentability, PCT International Patent Application No. PCT/EP2006/003136, dated Jan. 24, 2008.
International Search Report, PCT International Patent Application No. PCT/EP2006/003136, dated Feb. 5, 2007.
Written Opinion of the International Searching Authority, PCT International Patent Application No. PCT/EP2006/003136, dated Feb. 5, 2007.

* cited by examiner

LOAD AND CONSUMER

CROSS-REFERENCE TO RELATED APPLICATION

The present application is a continuation of U.S. patent application Ser. No. 11/920,218, filed on Nov. 9, 2007, which is a national phase of PCT International Application No. PCT/EP2006/003136, filed on Apr. 6, 2006, which claims priority to German Patent Application No. 10 2005 022 367.2, filed on May 10, 2005, each of which is expressly incorporated herein in its entirety by reference thereto.

FIELD OF THE INVENTION

The present invention relates to a load and a system.

BACKGROUND INFORMATION

In industrial plants, it is conventional that electrical loads, such as electronic devices, lighting devices, drives, machines, etc., can be powered galvanically from a network, in particular using alternating current at 50 or 60 Hz. To this end, the loads are mostly mechanically attached and electrically connected by expensive plug-and-socket connectors. In addition, most of such systems or machines have a T-piece for each drive unit as an energy branch. These T-pieces are difficult to install and expensive, in particular when they must be usable and provide a high degree of protection in wet areas or even aseptic areas. These T-pieces are also referred to as distribution boxes and often include additional device parts as well, such as emergency-off switches. Therefore, they are complicated and expensive, especially with regard to installation as well.

German Published Patent Application No. 103 60 604 describes a system and a load for a contactless power supply.

SUMMARY

Example embodiments of the present invention to provide simpler and more cost-effective wiring in electrical loads and systems.

Among features of a device and a method according to example embodiments of the present invention are that it includes device(s) for its inductive power supply, including an insertion part, following the insertion of which into the load the power supply of the latter is provided.

This allows for a quick connection to and disconnection from the power supplying system. It is not necessary to use exposed electrical contacts. In addition, the insertion part made of plastic is inexpensive to manufacture.

In this context, it may be provided that the load may be manufactured in a cost-effective manner to be impervious and to provide a high degree of protection, for the contactless powering of the load allows the housing to be manufactured simply and easily, in particular without uneven areas or plug-and-socket connectors, and therefore allows water to drain off and the settling of solids to be prevented. Therefore, it is particularly suitable in wet areas and aseptic areas. Example embodiments of the present invention may allow the time necessary for wiring to be reduced. In addition, leakage currents that occur in conventional plug-and-socket wiring are prevented, which means that improved electromagnetic compatibility is produced.

The power supply to the loads may be voltageless, and the carrying-over of voltage otherwise present in systems, as well as spark-suppression devices in disconnecting switches, may be eliminated. In addition, reactive-power compensation is made possible, in particular in the load, and therefore the alternating current has smaller values, which is why smaller wire diameters may be provided in the case of primary conductors and lower wiring costs are therefore attainable. Disconnecting switches may be eliminated, since interruption may be replaced by extraction of the primary conductor.

A lock, including shackle, can be attached to the insertion part in a form-locking manner, a key being required for detaching the lock from the insertion part. In particular, a bore hole is provided for the shackle of the lock. Only a deliberate and authorized removal of the power supply from the load may be possible.

The insertion part may be connectible to the load using devices such that the use of a tool is required. Only a deliberate and authorized removal of the power supply from the load may be possible.

The load may include a housing part, which has the function of forming a housing for an electric motor, a gear unit and an electronic circuit powering the electric motor, including frequency converter, the rotor shaft of the electric motor and the drive shaft of the gear unit being supported in the housing part and the insertion part being insertable into a receiving region of the housing part.

A housing part may thus be formed, which unites several functions, being a housing for various components of the drive and a receptacle for the power supply.

A primary conductor may be provided on the load such that an inductive coupling to a secondary winding contained by the load is providable. In this context, it may be provided that a plug-and-socket connector is not necessary, and the wiring may therefore be carried out in a simple and rapid manner. In addition, it is possible to reduce costs. Since it is not necessary to precut the cable and fit it with connectors, the installation may also be carried out by employees not trained in electrical technology.

At least one primary conductor may be provided in a groove or a cable duct of the load. In this context, the cable may be laid very simply and rapidly, e.g., by merely pressing it into the groove or the cable duct. In addition, encapsulation by an encapsulating material may be provided.

At least one secondary winding may be wound around a U-shaped and/or E-shaped core or integrated into a very shallow receiving head. In this context, the design may be selected as a function of the utilized method, desired power output, and desired efficiency.

The primary conductors may be at least partially encapsulated and/or protected by a cover. In this context, an especially high degree of protection is attainable, and no cavities may be produced which are at risk of being soiled. Such conductor parts encapsulated in a cover or holder may be mounted on a smooth housing surface of the load, which means that no groove or duct must be provided on the load.

The load may be impervious, smooth on the outer surface, and/or manufactured to have a high degree of protection. In this context, the load may be provided, in particular, for use in wet areas and/or aseptic areas.

It may be provided that the load does not include a plug-and-socket connector or other electrical connection terminals on its exterior. In this context, the load may be easily manufactured to be impervious and to provide a high degree of protection.

LIST OF REFERENCE CHARACTERS

1 Supply conductor of the primary conductor system
2 Return conductor of the primary conductor system 3 Insertion part
4 Converter gear motor as load
5 Elevations
6 bore hole
7 bore hole Example embodiments of the present invention are described in more detail below with reference to the appended Figures.

DETAILED DESCRIPTION

Figure 1:
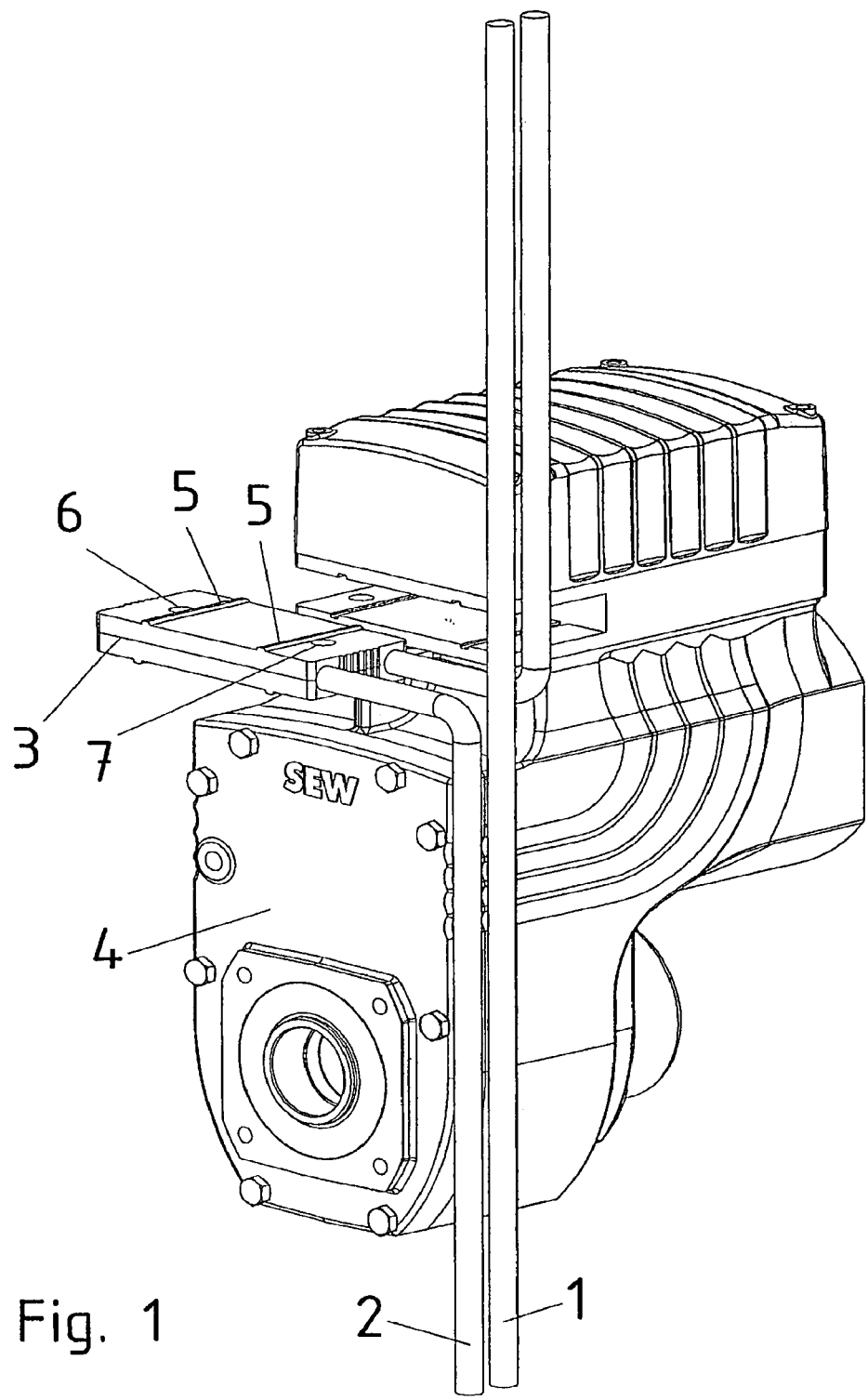
FIG. 1 schematically illustrates a load according to an example embodiment of the present invention, the load being disconnected from the power supply.
Figure 2:
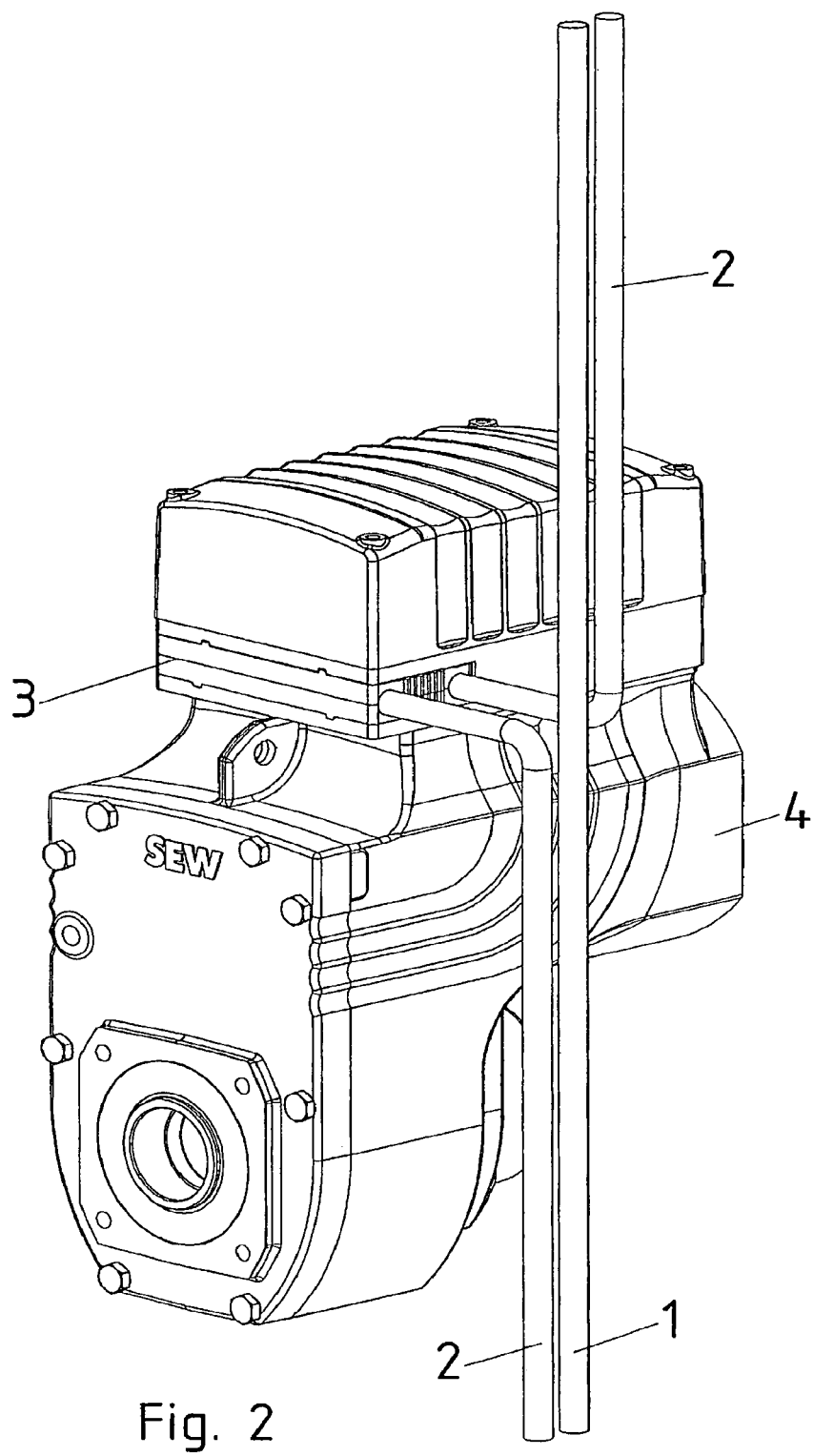
FIG. 2 schematically illustrates a load according to an example embodiment of the present invention including power supply.

The primary conductor system includes a supply conductor 1 and a return conductor 2, in which a medium-frequency alternating current is applied.

Load 4, taking the form of a converter gear motor, includes a secondary winding, which, following the insertion of insertion part 3, is inductively coupled to the primary conductor system.

Insertion part 3 has elevations 5 for a form-locking connection to load 4 or at least as a guide when inserting insertion part 3. Bore holes 6, 7 are additionally provided.

Using a bolt, which can be inserted through bore hole 6 and also inserted into a bore hole of the load, it is possible to couple insertion part 3 to load 4 in a form-locking manner. For this purpose, a tool is required, and only operators using the tool are able to release the connection.

When insertion part 3 has been taken out of the load, a padlock may be inserted by its shackle into bore hole 7. In this manner, it is possible to block the reinsertion of the insertion part into the load.

Thus, only an authorized operator having a key for the lock of the padlock is able to restore the electrical power supply of the load.

The load has a U-core or an E-shaped core, which couples the secondary winding to the primary conductor system in an improved manner.

What is claimed is:

1. A device, comprising:
    an inductive power device configured to inductively power a load, the inductive power device including an insertion part, the inductive power device configured to power the load after insertion of the insertion part into the load in an insertion direction, wherein the load at least partially contacts the insertion part when connected, and the load prevents movement of the insertion part in at least a first direction, the insertion part having a bore hole extending in a second direction different than the first direction and adapted to align with a corresponding bore hole, extending in the second direction, of the load, the bore hole of the insertion part and the bore hole of the load adapted to receive a bolt and/or a shackle of a lock, in the second direction, to couple the insertion part and the load in a form-locking manner and/or to block insertion of the insertion part into the load;
    wherein the insertion part includes at least one elevation extending along the insertion direction, and the load includes at least one track extending along the insertion direction, the at least one elevation being complementary to the at least one track; and
    wherein the at least one elevation is adapted to slide along the at least one track when the insertion part is inserted into the load in the insertion direction.

2. The device according to claim 1, wherein the inductive power device includes a primary conductor adapted to inductively couple to a secondary winding of the load.

3. The device according to claim 1, wherein at least one primary conductor is arranged in at least one of (a) an indentation and (b) a cable duct of the load.

4. The device according to claim 1, wherein at least one secondary winding is wound around a U-shaped core.

5. The device according to claim 1, wherein the load at least one of (a) is impervious, (b) is smooth on an outer surface, and (c) provides a high degree of protection for use in at least one of (a) wet areas and (b) aseptic areas.

6. The device according to claim 1, wherein the load does not include a plug-and-socket connector or other electrical connection terminals on an exterior.

7. The device according to claim 1, wherein information is transmittable by modulating higher-frequency signals onto a primary conductor.

8. The device according to claim 1, wherein the at least one elevation fits into the at least one track to prevent movement of the insertion part in at least a third direction; and
    wherein the first direction is different from the third direction.

9. The device according to claim 1, wherein the insertion part is completely removable from the load.

10. The device according to claim 1, wherein the at least one elevation fits into the at least one track to prevent movement of the insertion part in at least a third direction;
    wherein the first direction is different from the third direction; and
    wherein the first direction is substantially orthogonal to the third direction.

11. A system, comprising:
    loads powered in a contactless manner by inductively coupling each load to at least one primary conductor;
    wherein each load at least partially contacts an insertion part when connected, and the load prevents movement of the insertion part in at least a first direction; and
    wherein the insertion part includes a bore hole extending in a second direction different than the first direction and adapted to align with a corresponding bore hole, extending in the second direction, of the load, the bore hole of the insertion part and the bore hole of the load adapted to receive a bolt and/or a shackle of a lock, in the second direction, to couple the insertion part and the load in a form-locking manner to block insertion of the insertion part into the load;
    wherein the insertion part includes at least one elevation extending along an insertion direction of the insertion part, and the load includes at least one track extending along the insertion direction, the at least one elevation being complementary to the at least one track; and
    wherein the at least one elevation is adapted to slide along the at least one track when the insertion part is inserted into the load in the insertion direction.

12. The system according to claim 11, wherein primary conductor is removable from the load.

13. The system according to claim 11, wherein the primary conductor is encapsulated in the load.

14. The system according to claim 11, wherein the primary conductor is acted upon by medium-frequency, alternating current.

15. The system according to claim 11, wherein the primary conductor is acted upon by medium-frequency, alternating current of one of (a) approximately 10 to 50 kHz and (b) approximately 20 kHz.

16. The system according to claim 11, wherein the primary conductor is configured to power the loads in series.

17. The system according to claim 11 wherein at least one of (a) the primary conductor is supplied with energy in a contactless manner via stationary coil cores including at least one coil winding and (b) the primary conductor is supplied with energy via a collector wire.

18. The system according to claim 11, wherein the primary conductor is arranged as a closed loop.

19. The device according to claim 1, wherein the at least one elevation fits into the at least one track to prevent movement of the insertion part in at least a third direction; and wherein the first direction is different from the third direction.

20. The system according to claim 11, wherein the at least one elevation fits into the at least one track to prevent movement of the insertion part in at least a third direction; and wherein the first direction is different from the third direction.

21. A device, comprising:

an inductive power device configured to inductively power a load, the inductive power device including an insertion part, the inductive power device configured to power the load after insertion of the insertion part into the load in an insertion direction, wherein the load at least partially contacts the insertion part when connected, and the load prevents movement of the insertion part in at least a first direction, the insertion part having a bore hole extending in a second direction different than the first direction and adapted to receive a shackle of a lock, in the second direction, to block insertion of the insertion part into the load;

wherein the insertion part includes at least one elevation extending along the insertion direction, and the load includes at least one track extending along the insertion direction, the at least one elevation being complementary to the at least one track; and wherein the at least one elevation is adapted to slide along the at least one track when the insertion part is inserted into the load in the insertion direction.

* * * * *